(12) United States Patent
Chang et al.

(10) Patent No.: US 7,320,027 B1
(45) Date of Patent: Jan. 15, 2008

(54) SYSTEM HAVING GENERALIZED CLIENT-SERVER COMPUTING

(75) Inventors: Li Fung Chang, Holmdel, NJ (US); Hui Luo, Marlboro, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 11/249,075

(22) Filed: Oct. 12, 2005

Related U.S. Application Data (62) Division of application No. 10/140,537, filed on May 7, 2002, now abandoned.

(60) Provisional application No. 60/290,774, filed on May 14, 2001.

(51) Int. Cl.
*G06F 15/16* (2006.01)
(52) U.S. Cl. .................................... 709/219
(58) Field of Classification Search ........ 709/201–253; 710/1–74, 104; 719/311–332
See application file for complete search history.

(56) References Cited

U.S. PATENT DOCUMENTS

| | | | |
|---|---|---|---|
| 5,742,768 A * | 4/1998 | Gennaro et al. ............. 709/203 |
| 5,787,254 A * | 7/1998 | Maddalozzo et al. ........ 709/224 |
| 5,809,145 A * | 9/1998 | Slik et al. ...................... 705/52 |
| 5,825,877 A * | 10/1998 | Dan et al. ...................... 705/54 |
| 5,864,850 A * | 1/1999 | Nordman ..................... 707/10 |
| 5,867,651 A * | 2/1999 | Dan et al. .................... 709/203 |
| 5,870,544 A * | 2/1999 | Curtis ........................... 726/14 |
| 5,870,550 A * | 2/1999 | Wesinger et al. .......... 709/218 |
| 5,875,296 A * | 2/1999 | Shi et al. ........................ 726/5 |
| 5,924,116 A * | 7/1999 | Aggarwal et al. .......... 711/122 |
| 5,944,781 A * | 8/1999 | Murray ....................... 709/202 |
| 6,006,260 A * | 12/1999 | Barrick et al. ............. 709/224 |
| 6,012,098 A * | 1/2000 | Bayeh et al. ............... 709/246 |
| 6,192,415 B1 * | 2/2001 | Haverstock et al. ........ 709/245 |
| 6,236,365 B1 | 5/2001 | LeBlanc et al. |
| 6,247,044 B1 * | 6/2001 | Gosling et al. ............. 709/203 |
| 6,292,657 B1 | 9/2001 | Laursen et al. |
| 6,330,710 B1 * | 12/2001 | O'Neil et al. ............... 717/100 |
| 6,405,241 B2 * | 6/2002 | Gosling et al. ............. 709/203 |
| 6,412,008 B1 * | 6/2002 | Fields et al. ................ 709/228 |
| 6,434,598 B1 * | 8/2002 | Gish ........................... 709/203 |
| 6,574,663 B1 * | 6/2003 | Bakshi et al. .............. 709/223 |
| 6,587,879 B1 * | 7/2003 | Reynolds .................... 709/224 |
| 6,591,305 B2 * | 7/2003 | Densmore ................... 709/245 |
| 6,594,700 B1 * | 7/2003 | Graham et al. ............. 709/230 |
| 6,678,518 B2 * | 1/2004 | Eerola ...................... 455/422.1 |
| 6,691,227 B1 * | 2/2004 | Neves et al. ................ 713/162 |
| 6,766,454 B1 * | 7/2004 | Riggins ...................... 713/185 |
| 6,779,004 B1 * | 8/2004 | Zintel .......................... 709/227 |
| 6,954,777 B1 * | 10/2005 | Fields et al. ................ 709/203 |
| 7,009,956 B2 * | 3/2006 | Heinonen et al. ........... 370/338 |
| 7,043,563 B2 * | 5/2006 | Vange et al. ................ 709/245 |
| 2001/0037358 A1 | 11/2001 | Clubb et al. |

(Continued)

FOREIGN PATENT DOCUMENTS

EP    1 039 721 A2    9/2000

(Continued)

*Primary Examiner*—David Wiley
*Assistant Examiner*—J. Bret Dennison (57) ABSTRACT

A protocol provides generalized client-server computing by providing a server program that can utilize standard and non-standard ports for applications.

5 Claims, 4 Drawing Sheets

U.S. PATENT DOCUMENTS

2001/0041556 A1    11/2001  Laursen et al.
2002/0133549 A1*   9/2002   Warrier et al. .............. 709/204

FOREIGN PATENT DOCUMENTS

| WO | 0810524 A1 * | 12/1997 |
| WO | 0827075 A2 * | 3/1998 |
| WO | 08314092 A2 * | 3/1998 |
| WO | 0887750 A2 * | 12/1998 |
| WO | WO 01/56251 A2 | 8/2001 |
| WO | WO 01/86391 A2 | 11/2001 |
| WO | WO 01/97454 A1 | 12/2001 |

* cited by examiner

SYSTEM HAVING GENERALIZED CLIENT-SERVER COMPUTING

CROSS REFERENCE TO RELATED APPLICATIONS

This application is a divisional of U.S. patent application Ser. No. 10/140,537, filed on May 7, 2002 now abandoned, which claims the benefit of U.S. Provisional Patent Application No. 60/290,774, filed on May 14, 2001, which applications are hereby incorporated by reference in their entirety.

STATEMENT REGARDING FEDERALLY SPONSORED RESEARCH

Not Applicable.

FIELD OF THE INVENTION

The present invention relates generally to communication networks and, more particularly, to networks having client-server communication.

BACKGROUND OF THE INVENTION

As is well known in the art, personal portable networking devices (such as wireless personal digital assistants and network appliances) are becoming increasingly popular. As the number of such devices increases, the number of new applications running on these portable devices is also increasing. These portable devices require, in addition to traditional client-type applications such as Web browsing, server-type applications, e.g., server programs running on the user's device.

However, using the conventional networked-computing model, which is commonly referred as the "client-server" model, it is relatively difficult for a service provider to support large scale server-type computing to subscribers for a variety of reasons. For example, the private Internet Protocol (IP) addresses assigned to server devices located behind a firewall are invisible to clients located outside the firewall. In addition, even if the service provider can assign public Internet Protocol version 4 (IPv4) addresses to server devices behind the firewall, the service provider may not have enough such addresses to maintain a sufficient number of connections across the firewall simultaneously. Further, the conventional "client-server" model is server-centric and is effective at supporting a few well-known applications, each identified by a well-known port number.

For personal server-type applications, which may be of high diversity and not well known, it is inconvenient to associate each of these applications with a fixed port number. Also, although secure versions of various protocols have been developed for the purpose of protecting communications privacy, an eavesdropper can still determine the type of communications that are flowing between a client and a server by observing the well-known server port number.

It would, therefore, be desirable to provide a protocol that overcomes the aforesaid and other disadvantages.

SUMMARY OF THE INVENTION

The present invention provides a protocol for providing generalized client-server computing. With this arrangement, a client can submit a service request to a server that includes a module for installing a program from the client and selecting a port for the program. The server module then commands the installed program to listen for client service requests on the selected port. While the invention is primarily shown and described in conjunction with wireless devices and Internet protocols, it is understood that the invention is applicable to networks in general in which generalized client-server computing is desirable.

In one aspect of the invention, a client sends a service request message to a server via a gateway. A module on the server receives the request on a standard port, selects a server port and launches the requested program, which is commanded by the server module to listen on the selected port. The server module then sends a response to the client via the gateway that includes the selected port information for the requested program.

In an exemplary embodiment, the client sends an IP address query message to a default domain name service (DNS) server, using the server's hostname. The query eventually arrives at the border DNS server in the server's network. The border DNS server replies with the public IP address of a generalized server application (GSA) gateway that serves as the gateway router for the server's subnet and has the lightest load. The client ultimately receives the IP address of the GSA gateway. Using a uniform resource locator (URL) to indicate the requested server application, a client then sends a service request message to the GSA gateway at the standard TCP port for the generalized client-server protocol, as if the GSA gateway were the server. The GSA gateway sends an IP address query message to the border DNS, using the internal network interface. The border DNS server replies with the private IP address of the server. The GSA gateway forwards the service request message to the server and, more particularly, to the daemon program listening to the standard TCP port for the generalized client-server protocol.

The daemon program selects a port on the server, launches the requested server program and commands the server program to listen to the selected port. The daemon program then sends a response message back to the GSA gateway, with a "server-port" parameter. The GSA gateway creates a new network address/port translation (NAPT) record in its look-up table. In the record, an unused port number at the external interface is used to replace the port number given by the server as the public port number. The GSA gateway then rewrites the "server-port" parameter and sends the response message back to the client. The GSA gateway also periodically broadcasts this NAPT record to other GSA gateways. The client initiates client-server communications with the server using the GSA gateway's public IP address and the returned server port that also belongs to the GSA gateway. The subsequent client-server traffic is routed by GSA gateways according to the NAPT record.

With this arrangement, firewalls are transparent to client-server computing in both directions (from outside clients to inside servers and from inside clients to outside servers), even though the connections remain under the control of firewalls. In addition, a service provider needs a relatively low number, e.g., a few hundreds to thousands, of public IPv4 addresses to support millions of connections across firewalls simultaneously. Further, server-type applications are identified by URLs (instead of a fixed port number), which can be encrypted for better communications privacy. The advantages of the generalized client-server computing system include users, such as wireless device users, receiving information without polling servers on the network periodically. Thus uplink traffic in the service provider's network can be reduced significantly. Further new server-type applications can be easily developed to push information to users, such as location-based applications. In addition, privacy for clients and servers is enhanced by hiding the type of communication being exchanged.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
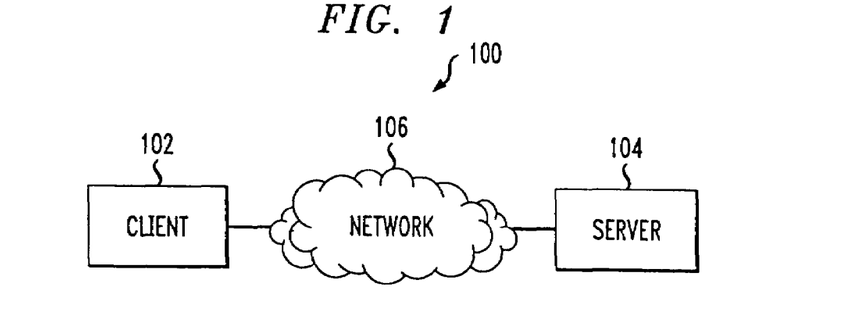
FIG. 1 is a schematic representation of a system having generalized client-server computing in accordance with the present invention.

FIG. 1 shows an exemplary system 100 providing a generalized client-server protocol for personal server-type computing in accordance with the present invention. In general, a client 102 interacts with a server 104 via a network 106 to launch existing applications and install new applications on the server. To enhance the flexibility of the system, the server 104 can be identified by a character string, such as a URL, and a port number can be designated for new applications as described more fully below.

Figure 2:
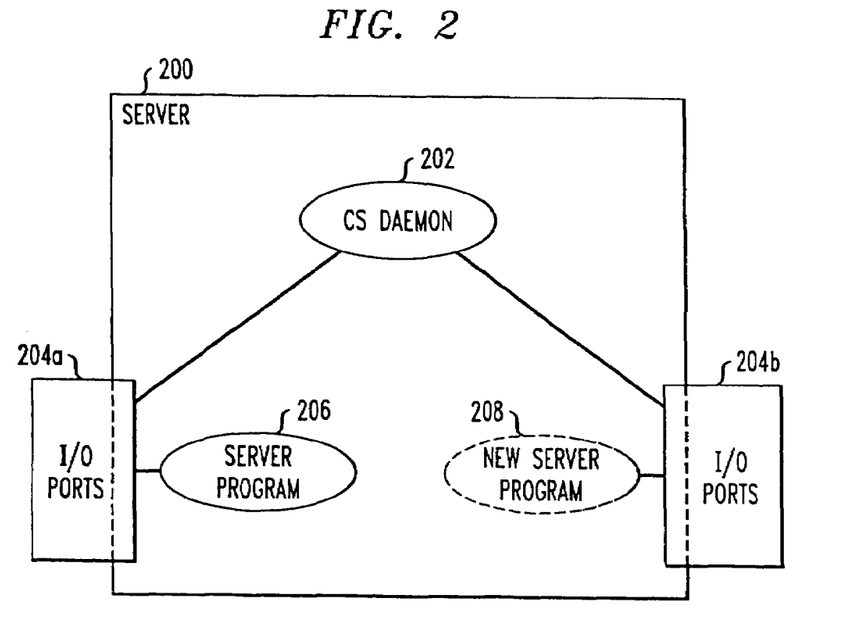
FIG. 2 is a schematic depiction of a server that can form a part of the system of FIG. 1.

In an exemplary embodiment shown in FIG. 2, a server 200, which can correspond to the server 104 of FIG. 1, is provided as a portable IP-based networking device supporting generalized server computing in accordance with the present invention. The server 200 runs a server module or daemon program 202 after power up. The server 200 includes first and second I/O connectors 204a,b each having a series of ports for interconnecting various network devices in an manner well known to one of ordinary skill in the art. During normal operation, the daemon program 202 listens to a predetermined port, e.g., a TCP port, that is the well-known port for a particular generalized client-server protocol and waits for incoming connection requests.

The daemon program 202 can also listen to a non-standard TCP port, depending on configurations by the user. It is understood, however, that if the daemon program 202 listens to a non-standard TCP port, the daemon may not be able to receive connection requests from clients outside of firewalls.

Referring again to FIG. 1 in combination with FIG. 2, when the client 102, which can be provided as a portable IP-based networking device, requests service for a generalized server application, the client first sends a service request message to the daemon program 202 running at the server using the standard or non-standard TCP port for the particular generalized client-server protocol.

In an exemplary embodiment, the service request message from the client 102 has the following format, which is similar to that of an HTTP request message.

Command + " " + Generalized server application URL + " " + Version number + CR + LF
CR + LF
Parameter name + ": " + Parameter value + CR + LF
Parameter name + ": " + Parameter value + CR + LF
Parameter name + ": " + Parameter value + CR + LF
CR + LF
Optional content An illustrative command set includes "GET" and "PUT" commands. A "GET" command instructs the daemon program 202 to launch the requested server program 206, which already exists on the server, for conventional client-server computing. A "PUT" command instructs the daemon program 202 to install a new server program 208, which is wrapped in the optional content, on the server 200 and optionally to launch it for conventional client-server computing.

In general, "PUT" commands include the optional content and a "content-length" parameter that identifies the number of bytes for the optional content. Note that the optional content can include a recursive structure. That is, the optional content can contain a child parameter block and, optionally, a child optional content. In this case, a "child-parameter-block" parameter must be presented in the parent parameter block and, if a child optional content exists, another "content-length" parameter that identifies the number of bytes for the child optional content should be included in the child parameter block.

In one embodiment, the generalized server application URL has the following format.

Protocol name + "://" + Server hostname + Optional port number + "/" +
Optional server program filename In one particular embodiment, the protocol name is "gsa" (generalized server application) or "sgsa" (secure generalized server application). The server hostname is a dotted character string, e.g., a URL, such as pcluo.research.att.com, which identifies the server host. It should be noted that it is preferred not to use an explicit IP address for the purpose of keeping transparency for generalized server-type computing across firewalls. The optional port number begins with a character, e.g., ":". In general, the port number is included only if the daemon program is not listening to the standard well-known port for the generalized client-server protocol. The optional server program filename identifies the generalized server program with a path that may or may not be a full path, depending on the configuration for the user.

If the protocol name is "sgsa", the optional server program filename does not exist in the URL. Instead, a "server-program-filename" parameter can be used for this purpose. In this case, all parameters except some cryptographic configuration parameters, such as "encryption-algorithm" and "MAC-algorithm," can be encrypted as a child parameter block and wrapped in the optional content. The encryption key should be a pre-arranged key between the client and the server or should be the public key of the server. The exchange of encrypted information is well known to one of ordinary skill in the art.

After receiving the service request message, the daemon program 202 decrypts the parameters in the child parameter block if necessary, interprets the command, and proceeds as described below.

In response to a "GET" command, the daemon program 202 first determines whether the requested server program has already been running on the server. If so, the daemon program 202 sends a positive response message back to the client 102. Otherwise, the daemon program 202 selects a port and launches the server program 206, which listens to the selected port.

In case of a "PUT" command, the daemon program 202 first checks the user's security policy on running server programs sent to the client 104, determines whether the server environment satisfies the running requirements, and verifies the digital signature and client's security certificate, if necessary. After verification, the daemon program 202 installs the server program 208, selects a port, launches the server program, and commands the program 208 to listen to the selected port.

In one embodiment, the service request message from the client 102 includes a "linger-time" parameter indicating how long the server program 208 can continue running after the last active connection is closed. A server program that supports the generalized client-server computing should accept two command line parameters, namely "server-port" and "linger-time."

Regardless of whether the requested server program can be launched successfully, the daemon program 202 sends a response message back to the client, which can have the following format (similar to that of an HTTP response message):

Protocol name and version number +" "+ Response code + " " +
Response message + CR + LF
CR + LF
Parameter name + ": " + Parameter value + CR + LF
Parameter name + ": " + Parameter value + CR + LF
Parameter name + ": " + Parameter value + CR + LF
CR + LF
Optional content The response code identifies whether the server program is ready. If so, a "server-port" parameter is included in the response message. Otherwise, the reason of failure is indicated by the response code. Similarly, if there exists an optional content, a "content-length" parameter is included to identify the number of bytes for the optional content.

If the protocol name is "sgsa", the parameters, except some cryptographic configuration parameters and the "server-port" parameter, can be encrypted as a child parameter block and wrapped in the optional content. The encryption key should be a pre-arranged key between the client and the server or the public key of the client. In an exemplary embodiment, the "server-port" parameter is not encrypted to retain transparency for generalized server-type computing across firewalls.

After receiving a positive response message and decrypting parameters in the child parameter block, if necessary, the client 102 can initiate the conventional client-server communications to the server 200 using the returned server port.

Figure 3:
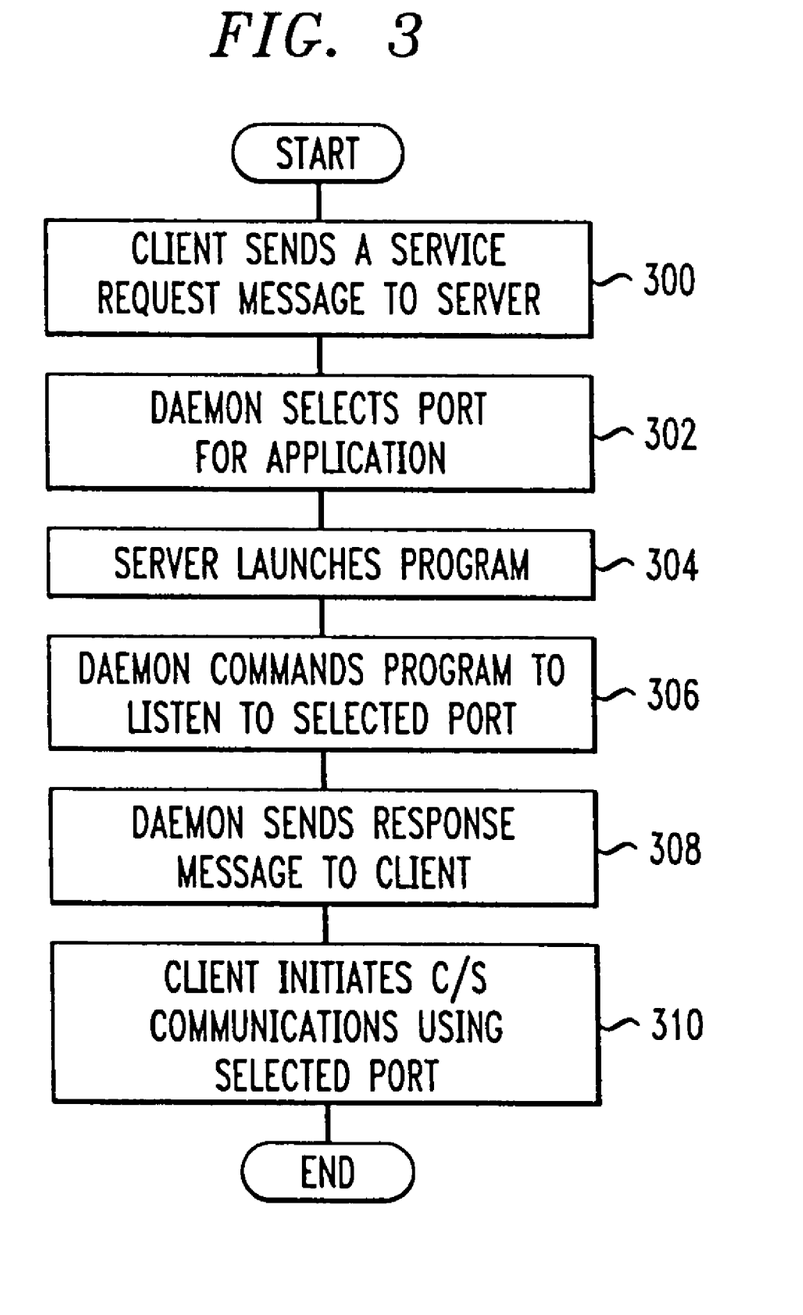
FIG. 3 is a flow diagram for implementing generalized client-server computing in accordance with the present invention.

FIG. 3 shows an exemplary sequence of steps for implementing generalized client-server computing in accordance with the present invention. The described steps assume a successful service request and no firewall.

In step 300, a client sends a service request message to a daemon program at the server, which listens to the standard or non-standard TCP port for the generalized client-server protocol. In an exemplary embodiment, a URL is used to indicate the requested server application. In step 302, the daemon program selects a port on the server, in step 304 launches the requested server program and, in step 306, commands the server program to listen to the selected port. The daemon program then sends a response message back to the client with a "server-port" parameter in step 308. In step 310, the client initiates client-server communications to the server using the returned server port.

The inventive generalized client-server protocol renders firewalls and network address translators transparent to the generalized client-server connections on both directions (from inside clients to outside servers, and from outside clients to inside servers) while these connections are still under control. It is understood that for the remaining description, transparency is discussed only for the connections from outside clients to inside servers, since existing firewalls and network address translators are already transparent to the connections established on the other direction.

Figure 4:
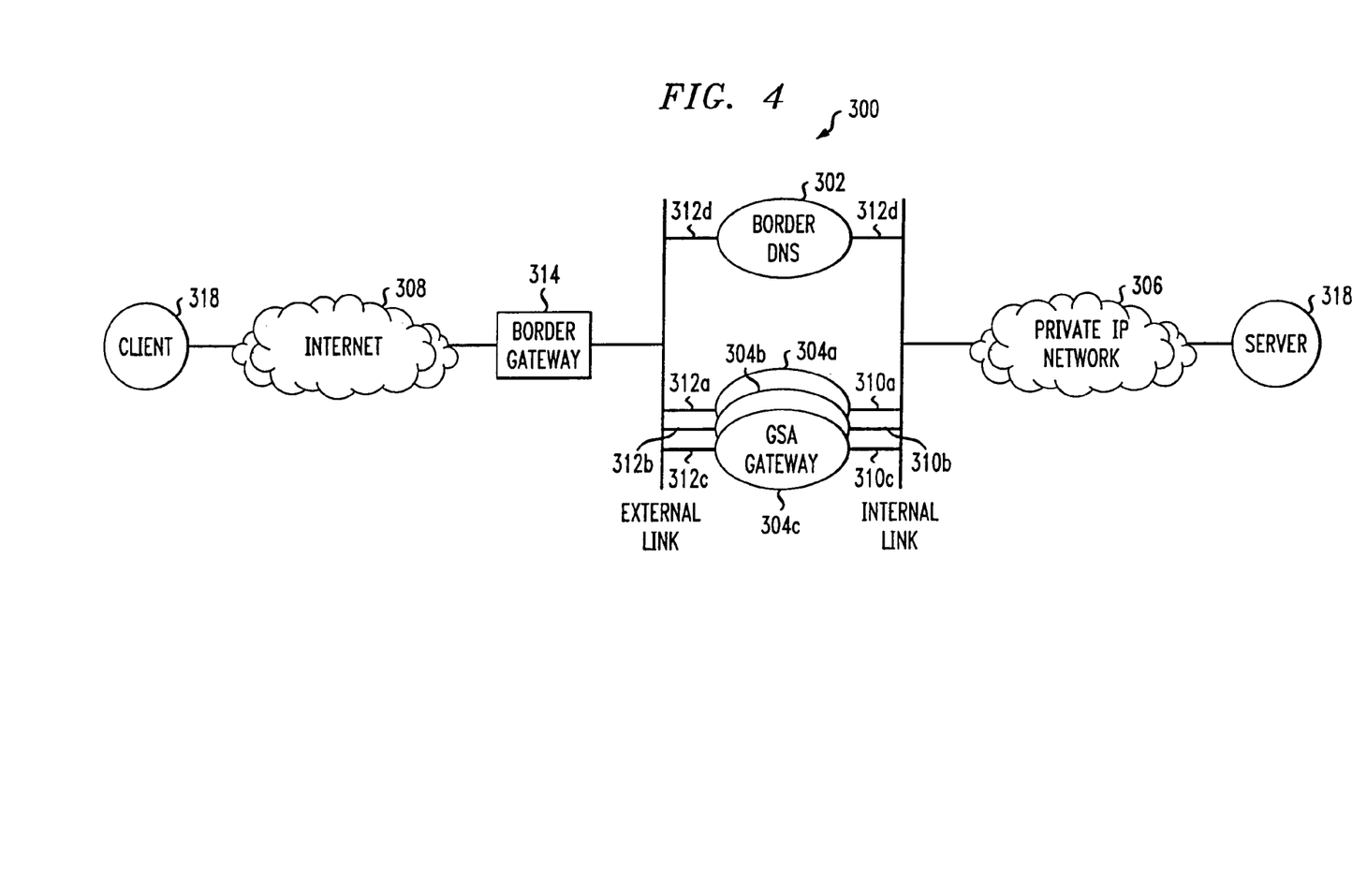
FIG. 4 is a further schematic depiction of a system having generalized client-server computing in accordance with the present invention.

FIG. 4 shows an exemplary network 300 providing generalized client-server computing in accordance with the present invention. The system 300 includes a border DNS server 302 and a series of GSA (generalized server application) gateways 304a,b,c, on the border between a private IP network 306, such as a service provider's private IP network, and the Internet 308. Each of the border DNS server 302 and the GSA gateways 304a,b,c include respective internal network interfaces 310a-d and external network interfaces 312a-d. The system 300 further includes a border gateway 314 coupled between the Internet 308 and the GSA gateways 304. A client 316 is connected to the Internet 308 and can request services from a server 318 coupled to the private IP network 306.

In an exemplary embodiment, the private IP network 306 is at most a class A subnet using an IPv4 subnet mask "10.x.x.x," which is dedicated to private IP networks. Alternatively, the private network can be an IPv6 network. It is understood, without limiting the invention, that IPv4 implementations are shown and described herein to facilitate an understanding of the invention. In addition, it is assumed that GSA gateways 304 are on the same link at both internal and external interfaces for the purpose of simplicity. However, a variety of alternative border configurations will be readily apparent to one of ordinary skill in the art. For example, if the private IP network 306 has many subnets, the GSA gateways 304 can be grouped. The external interfaces 312 of the GSA gateways 304 are still on the same link, but only the internal interfaces 310 of GSA gateways in the same group are on the same link.

It is understood that a GSA gateway 304, as used herein, refers to a particular gateway router. The GSA gateway 304, in addition to generalized client-server functionality in accordance with the present invention, can also function as a generalized client-server proxy, a firewall, and a network address/port translator. To be a generalized client-server proxy, a GSA gateway includes a daemon program listening to the standard TCP port for the generalized client-server protocol, as described above. As a firewall, a GSA gateway should include some policy-enforced routing functions, which can also apply to the generalized client-server computing traffic through the help of the generalized client-server proxy. To provide a network address/port translator function, the GSA gateway includes a look-up table in memory, each item of which, called a NAPT (network address/port translation) record, associates a pair of private IP address/port numbers, a pair of public IP address/port numbers, and a timer together for an inside host that has an active connection to outside. In the present embodiment, the public IP address of a GSA gateway serves as the public IP address for an inside host.

The border DNS server 302 is used to answer IP address queries from both internal hosts (from the internal link 310) and external hosts (from the external link 312). If an IP address query comes from an internal host and if the queried IP host is in the domain of the service provider's network, a private IP address is returned, with a relatively long TTL (time-to-live). If an IP address query comes from an internal host, and if the queried IP host is on the Internet 308, a public IP address is retrieved from a corresponding DNS server, cached, and returned. If an IP address query comes from an external host and if the queried IP host is in the domain of the service provider's network 306, the border DNS server 302 checks the load statistics of GSA gateways that serve as gateway routers for the server's subnet and then returns the public IP address of the GSA gateway 304 that currently has the lightest load, with the shortest TTL. The border DNS server 304 should not answer any query from external hosts for any IP host that is not in the service provider's network.

There are some additional protocols between the GSA gateways 304a,b,c on the same internal link. Each GSA gateway 304 periodically broadcasts its load information on the link so that every GSA gateway knows which one has the lightest load. If one GSA gateway fails to broadcast for a predetermined amount of time, it is considered out of service by the other gateways. If this case, the GSA gateway that has the lightest load among living gateways can begin to run Proxy Address Resolution Protocol (ARP) for the dead GSA gateway and process all the traffic for the dead one, until the dead GSA gateway reclaims its existence.

There are also some additional protocols between the GSA gateways 304 and the border DNS server 302 so that the border DNS server can trace the load statistics and network configurations for the GSA gateways.

Figure 5:
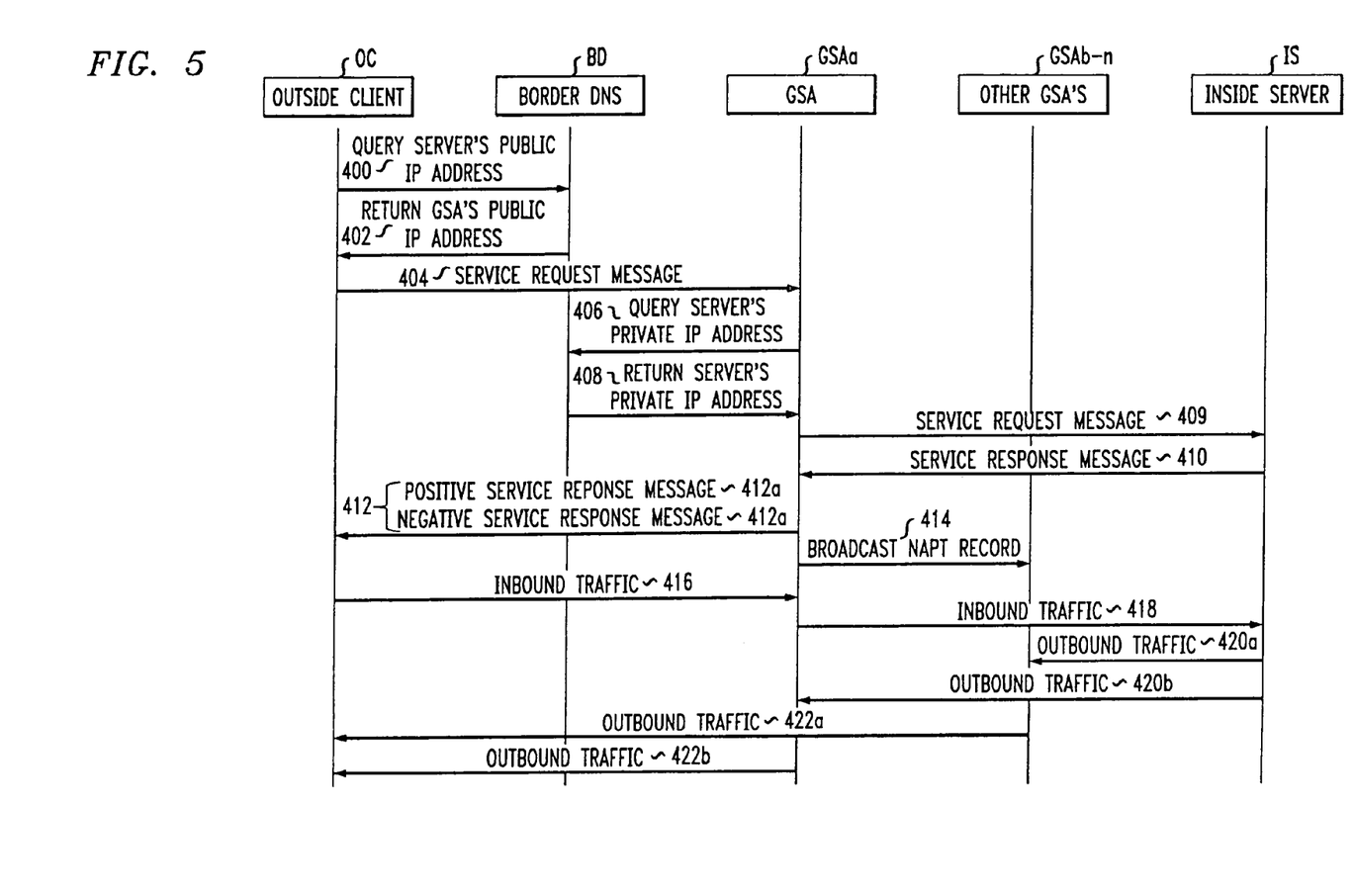
FIG. 5 is a data flow diagram showing generalized client-server computing in accordance with the present invention.

FIG. 5 shows an exemplary connection sequence diagram for an outside client OC to an inside server IS handled by a GSA gateway GSAa. The diagram assumes that a client on the Internet wants to initiate an inventive generalized client-server connection to a server in a private IP network. The client knows the server's hostname, for example, "pcluo.research.att.com," but does not know the IP address of the server.

The client OC first sends an IP address query message to its default DNS server in step 400. The query message eventually arrives at the border DNS server BD that is responsible for the domain of ".research.att.com." The border DNS server BD then finds that this IP address query is from an external host and the queried IP host is an inside one. In step 402, the border DNS server BD selects a GSA gateway that has the lightest load and returns the public IP address of this GSA gateway to the querying host. The returned IP address is assigned the shortest TTL so that the DNS query result is prevented from being cached by the default DNS server at the client side.

In step 404, after receiving the IP address query result, the client OC sends a service request message to the GSA gateway GSA using the standard well-known TCP port for the generalized client-server protocol, as if the GSA gateway GSAa were the server host "pcluo.research.att.com."

After receiving the service request message from the client, the GSA gateway first checks all kinds of security policy, including per-subscriber policy, to see if the service request can go through the firewall. If not, the GSA can immediately send a negative response message to the client in step 412b. Otherwise, the GSA gateway needs to forward the service request message to the server. Assuming the GSA gateway does not know the server's private IP address, in step 406 the GSA gateway GSAa sends an IP address query message to the border DNS server BD using the internal network interface. As a consequence, the border DNS server finds that this IP address query is for an internal host from another internal host, and thus returns the private IP address of the server to the GSA gateway in step 408, with a relatively long TTL, which allows the GSA gateway to cache this DNS query result for performance improvement.

After receiving the private IP address of the server, the GSA gateway forwards the service request message to the server in step 409, using the private IP address and the standard well-known TCP port for the generalized client-server protocol. The GSA gateway can insert a "linger-time" parameter in the forwarding message, which is equal to the expiration time associated for a NAPT record in the look-up table. In the above process, if the client uses "sgsa" instead of "gsa" to identify the protocol, the GSA gateway cannot know what type of communications will happen shortly between the outside client OC and the inside server IS. If this situation is contrary to the security policy set by the service provider, the GSA gateway GSAa denies the service request immediately by sending a negative service response message to the client in step 412b.

After receiving the service request message from the GSA gateway, the daemon program at the server IS interprets and processes the message as if the GSA gateway GSAa were the client, and sends a response message back to the GSA gateway in step 410.

After receiving a positive response message from the server IS, the GSA gateway may need to create a NAPT record in the look-up table using an unused port number of the GSA gateway at the external interface as the public port number for the server. The port number can be selected from a so-called NAPT port range, e.g., 10000-30000, such that the GSA gateway can immediately identify whether an incoming IP packet is targeting itself or an inside host based on the destination TCP/UDP port number of the incoming IP packet. The public IP address of the GSA gateway serves as the public IP address for the server IS. The value of the "server-port" parameter given by the server IS is also saved in the NAPT record as the private port number for the server IS. It is then replaced by the public port number in the response message that is forwarded by the GSA gateway to the client in step 412a.

As soon as the GSA gateway finishes forwarding the response message, the timer associated with the new NAPT record starts ticking. In addition, the GSA gateway needs to broadcast this new NAPT record to all GSA gateways GSAb-N on the same link in order for other GSA gateways to be able to route the return traffic back to the client in step 414, as discussed below. The GSA gateway GSAa also needs to broadcast this NAPT record periodically within an interval less than the value of the linger-time parameter. It is understood that for efficiency, all or some of NAPT records can be bundled together in broadcast.

After receiving a positive response message from the server IS, the GSA gateway forwards it to the client OC in step 412a.

After receiving the response message from the GSA gateway, the client OC can initiate a conventional client-server connection to the server, using the returned server port.

In subsequent client-server connection requests, IP packets sent from the client OC to the server IS arrive at the external network interface of the GSA gateway in step 416, because the destination IP address is the GSA gateway's public IP address. Whenever receiving an IP packet from the external network interface, the GSA gateway first determines whether the destination port number of the IP packet belongs to the NAPT port range. If so, the GSA gateway then determines whether it appears as a public port number for an inside host in some NAPT record in the look-up table. If it is, the destination IP address and port number of this IP packet, which are public, are replaced by the corresponding private addresses saved in the NAPT record. The source IP address and port number, which belong to the client, are not altered. The IP packet is then forwarded to the server IS using the internal network interface in step 418. In addition, the timer associated to the corresponding NAPT record is reset and then starts ticking.

After receiving the client-server connection request, the server IS duplicates a regular socket from the listening socket to handle this incoming connection, with the server's private IP address and the listening port as the socket's source address and the client's public IP address and port number as the socket's destination address. The server IS can then directly answer the client.

Consequently, every IP packet sent from the server IS to the client goes back to the internal network interface of the GSA gateways in step 420b. It is understood that the IP packets may flow through other GSA gateways that act as the inside server to outside clients in step 420a. Similarly, whenever receiving an IP packet from the internal network interface, the GSA gateway first checks if the source port number of this IP packet belongs to the NAPT port range. If so, the GSA gateway then checks if it appears in some NAPT record in the look-up table. If it does, the source IP address and port number of this IP packet, which are private, are replaced by the corresponding public information saved in the NAPT record. The destination IP address and port number, which belong to the client, are not altered. The IP packet is then forwarded to the Internet using the external network interface of the primary GSA gateway in step 422b or other GSA gateway in step 422a.

The present invention provides a protocol for generalized client server computing that can support massive server-type computing across firewalls based on conventional client-type techniques. The inventive server-type computing model is more network-friendly because it enables users to receive information without periodically polling a server on the network. As a result, the amount of uplink traffic can be reduced significantly. Further, the URL-based scheme described above can maximize diversity of server-type applications, increase the interoperability between client programs and server programs developed by different vendors, and render it easier to introduce new networking applications. Also, the efficient use of public IPv4 addresses is significant for relatively large service providers, since at present there is no class A IPv4 address block available. With the present invention, a service provider can set up a class A private network and support a relatively large number, e.g., millions, of connections across firewalls simultaneously by use of only a few hundred to several thousand public IPv4 addresses.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method of providing a generalized client-server protocol between a client and a server crossing a GSA gateway, comprising:

sending an IP address query message to a default DNS server by the client using a hostname for the server;

transmitting a reply to the client by a border DNS server with a public IP address of a GSA gateway that serves as a gateway router for the server's subnet;

receiving a service request message for a Server program from the client at the GSA gateway at a standard TCP port for the generalized client-server protocol, the service request including an installing module having a URL to indicate the requested server program which is stored at the client;

sending an IP address query message by the GSA gateway to the border DNS server using an internal network interface;

sending a private IP address of the server by the border DNS server in response to the IP address query message;

forwarding the service request message by the GSA gateway to a server module listening to the standard TCP port for the generalized client-server protocol;

selecting a port on the server with the server module;

installing the Server program stored at the client with the installing module;

launching the requested Server program with the server module;

commanding the requested Server program to listen to the selected port;

sending a response message by the server module to the GSA gateway with information for the selected port;

generating a NAPT record in the GSA gateway such that the record includes an unused port number at an external interface to replace a port number given by the server as the public port number; and rewriting the server port information and sending a response message to the client.

2. The method according to claim 1, further including periodically broadcasting the NAPT record to other GSA gateways that are grouped together for load balancing and failure over.

3. The method according to claim 1, further including initiating client-server communications between the client and the server using the GSA gateway's public IP address and the returned server port associated with the GSA gateway.

4. The method according to claim 1, further including routing the client-server communication according to the NAPT record.

5. The method according to claim 1, further including identifying the server with a URL.

\* \* \* \* \*